United States Patent [19]

Langill, Jr. et al.

[11] 4,248,263
[45] Feb. 3, 1981

[54] DIGITAL FLUID FLOW CONTROL APPARATUS

[75] Inventors: Addison W. Langill, Jr., Costa Mesa, Calif.; Harry Friedland, Houston, Tex.

[73] Assignee: Powell Industries, Inc., Houston, Tex.

[21] Appl. No.: 17,693

[22] Filed: Mar. 5, 1979

Related U.S. Application Data

[63] Continuation-in-part of Ser. No. 689,071, May 24, 1976, abandoned, which is a continuation of Ser. No. 432,153, Jan. 10, 1974, abandoned, which is a continuation-in-part of Ser. No. 169,940, Aug. 9, 1971, Pat. No. 3,726,296, which is a continuation-in-part of Ser. No. 142,681, May 12, 1971, abandoned.

[51] Int. Cl.³ .............................................. F16K 1/00
[52] U.S. Cl. ................................. 137/454.2; 137/599
[58] Field of Search ................... 137/454.2, 454.6, 599

[56] References Cited

U.S. PATENT DOCUMENTS

| | | | |
|---|---|---|---|
| 2,589,373 | 3/1952 | Hammock | 137/599 |
| 3,062,410 | 11/1962 | Schwieger | 137/599 X |
| 3,331,393 | 7/1967 | Ernyel | 137/599 |
| 3,502,105 | 3/1970 | Ernyel | 137/599 |
| 3,875,964 | 4/1975 | Friedland | 137/599 |
| 3,937,248 | 2/1976 | Hutton | 137/599 X |
| 4,019,533 | 4/1977 | Jerde | 137/599 |

Primary Examiner—Robert G. Nilson
Attorney, Agent, or Firm—Christie, Parker & Hale

[57] ABSTRACT

A core removably fits into an open cavity with an outer casing. The walls of the cavity and the core define an upstream manifold, a downstream manifold, and a planar manifold separating partition that lies at an acute angle to a flow plane aligned with the inlet to the upstream manifold and the outlet from the downstream manifold. A plurality of individually actuatable bistable valve elements are individually mounted onto the core without threaded bore connections in a parallel arrangement to connect the upstream and downstream manifolds across the partition. Preferably, the bistable valve elements each have a double cage between which a plug is guided from an open position to a closed position.

12 Claims, 3 Drawing Figures

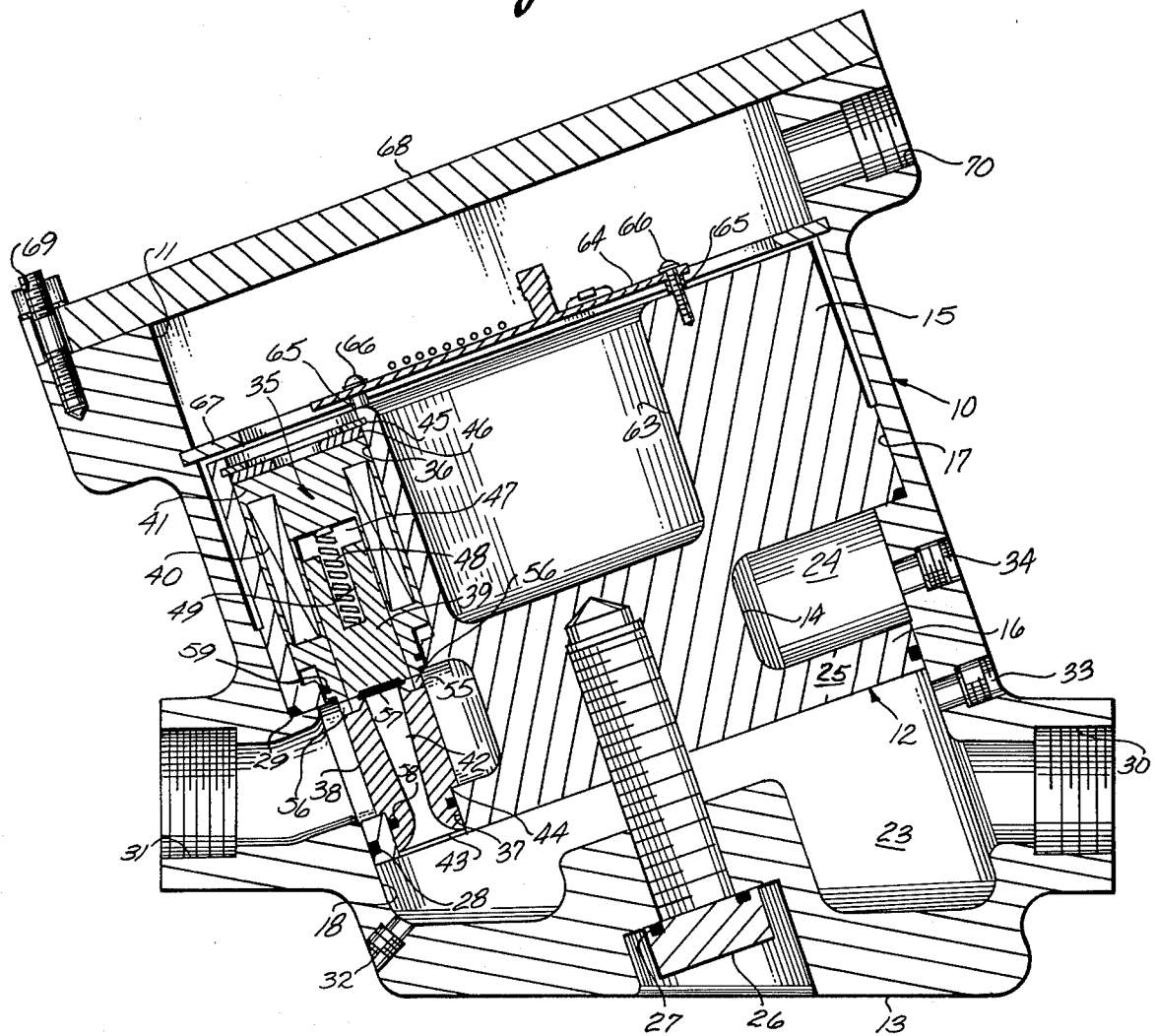

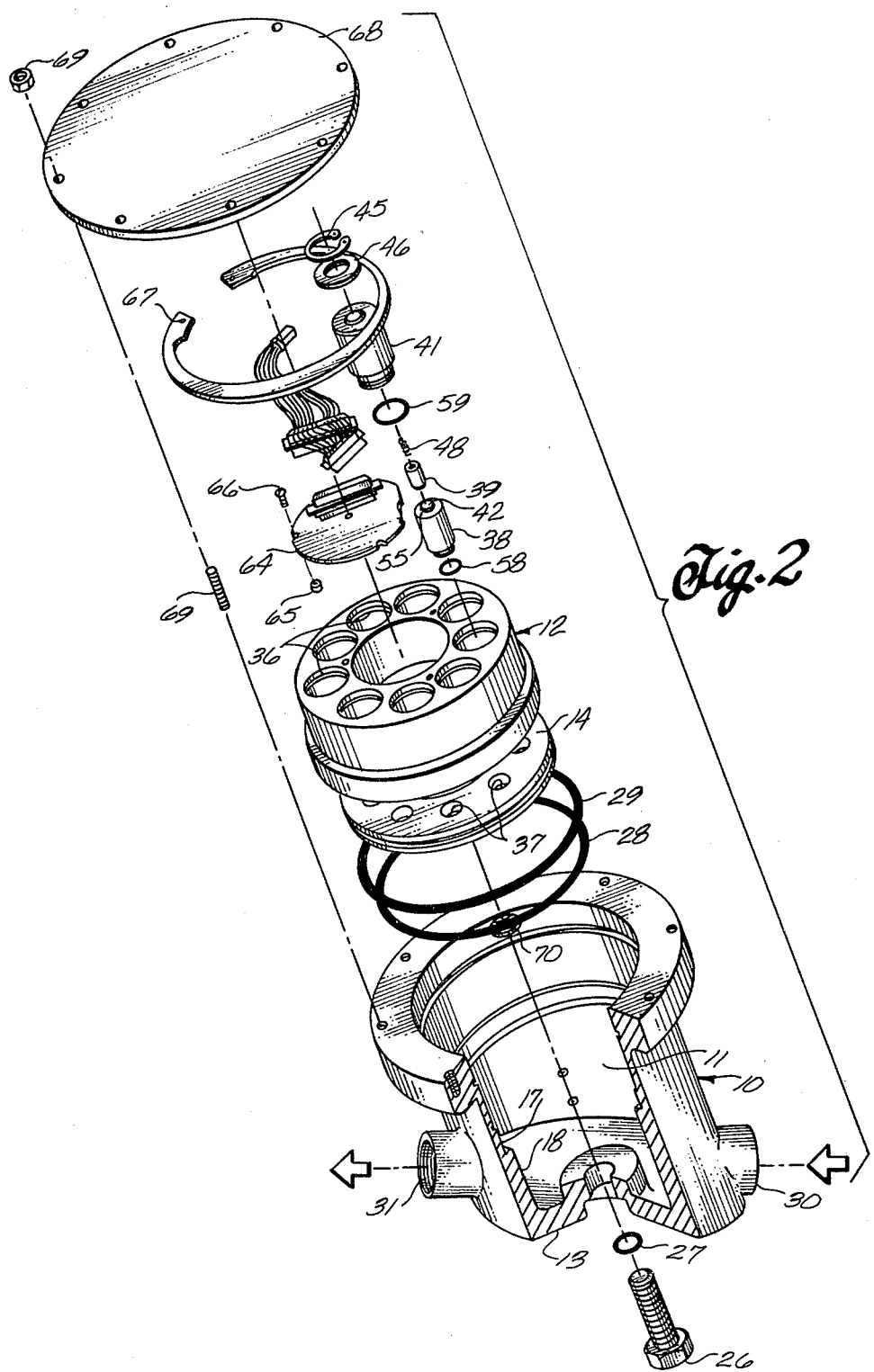

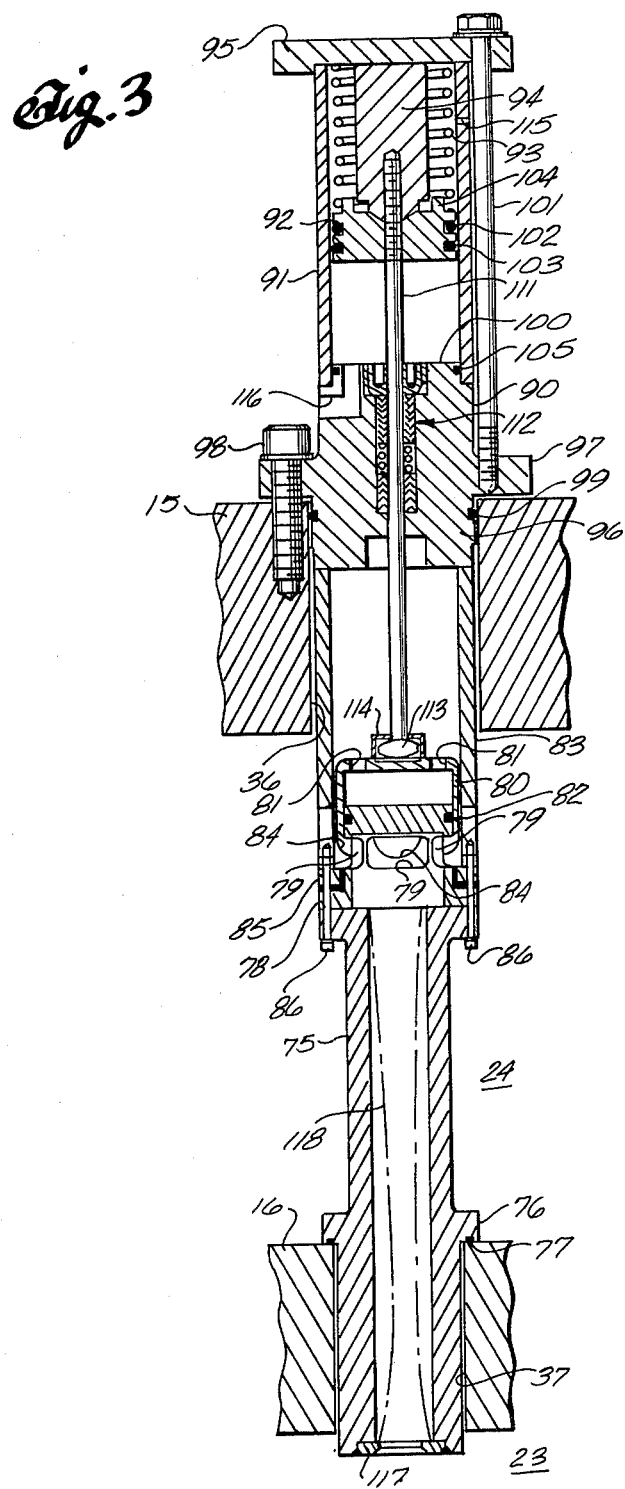

DIGITAL FLUID FLOW CONTROL APPARATUS

CROSS REFERENCE TO RELATED APPLICATIONS

This is a continuation-in-part of application Ser. No. 689,071, filed May 24, 1976, which is a continuation of application Ser. No. 432,153, filed Jan. 10, 1974, now abandoned, which is a continuation-in-part of application Ser. No. 169,940, filed Aug. 9, 1971 (which issued as U.S. Pat. No. 3,726,296 on Apr. 10, 1973), and Ser. No. 169,930, filed July 17, 1980 which are continuation-in-parts of application Ser. No. 142,681, filed May 12, 1971, now abandoned.

BACKGROUND OF THE INVENTION

This invention relates to the field of process control and, more particularly, to digital fluid flow control apparatus.

Digital fluid flow control has been practiced for many years. A plurality of individually actuatable bistable, i.e., ON/OFF, valve elements are connected in parallel between an upstream manifold and a downstream manifold. The valve elements have orifices that are weighted in area, usually according to a geometric progression. By selectively opening and closing different combinations of valve elements, the fluid flow rate can be controlled over a wide range from zero to a maximum value. Typical digital fluid flow control apparatus is disclosed in U.S. Pat. No. 3,746,041, which is assigned to the assignee of the present application.

Because of the large number of bistable valve elements, digital fluid flow apparatus has many more parts than its analog counterpart. For this reason, it is important that these parts be readily accessible for inspection, cleaning, and repair, and that assembly of the parts be simplified. It is also advantageous to be able to take the parts off line for inspection, cleaning, or repair without taking the apparatus out of the fluid line in which it is operating. Further, it is desirable to have a single valve design that can be scaled to fluid lines having a wide range of diameters.

SUMMARY OF THE INVENTION

The invention provides digital fluid flow control apparatus in which the parts are easily accessible for off line inspection, cleaning, and repair without removal of the apparatus from the fluid line. The apparatus can be scaled to fluid lines having a wide range of diameters.

According to a feature of the invention, a housing has an upstream manifold to which a fluid inlet is connected, a downstream manifold to which a fluid outlet lying in the same plane as the inlet is connected, and a planar partition between the upstream and downstream manifolds, wherein the partition lies at an acute angle to the plane of the inlet and the outlet. A plurality of individually actuatable, parallel bistable valve elements connect the upstream and downstream manifolds across the partition. The resulting nonradial, acutely angled arrangement of valve elements permits the apparatus to be scaled to flow lines having a large range of diameters without proportionately increasing the space requirements.

Another feature of the invention is a bistable valve element having a double cage between which a plug is guided from an open position to a closed position. Specifically, a hollow inner cylindrical cage has a closed end, an open end communicating with one manifold, and side wall perforations communicating with the other manifold. A hollow cylindrical plug surrounds the inner cage and slides axially thereover to cover and uncover the side wall perforations of the inner cage. An outer tubular cage surrounds the plug for at least the full length of the plug's stroke. The interior of the outer cage communicates with the other manifold through perforations in its side wall.

BRIEF DESCRIPTION OF THE DRAWINGS

The features of specific embodiments of the best mode contemplated of carrying out the invention are illustrated in the drawings, in which:

FIG. 1 is a side sectional view of digital fluid flow control apparatus incorporating the principles of the invention;

FIG. 2 is an exploded view of the apparatus of FIG. 1; and

FIG. 3 is an alternative embodiment of one valve element of the apparatus of FIG. 1.

DETAILED DESCRIPTION OF THE SPECIFIC EMBODIMENTS

With reference to FIGS. 1 and 2, digital fluid flow control apparatus comprises an outer casing 10 having an open cavity 11 and a core 12 that removably fits into cavity 11. Casing 10 and core 11 together constitute a valve housing. Casing 10 is typically a generally cylindrical casting having an end wall 13 lying at an acute angle to the cylindrical axis. Core 12 is also typically a casting in which a deep annular groove 14 is formed. On the exterior facing side of groove 14, core 12 has a portion 15 with a circular cross section that is larger than the circular cross section of a portion 16 on the interior facing side thereof. Similarly, cavity 11 has an exterior portion 17 having a larger circular cross section than an interior portion 18. As shown in FIG. 1, when core 12 is in place in cavity 11, the end of portion 15 rests on a shoulder formed between exterior portion 17 and interior portion 18 of cavity 11, and portion 16 is spaced from end wall 13 to define an acutely angled cylindrical upstream manifold 23. Groove 14 and interior portion 18 define a cylindrical downstream manifold 24, and portion 16 defines a planar partition 25 between manifolds 23 and 24. Core 12 is held in place in cavity 11 by a bolt 26 that passes through end wall 13 to form a threaded connection with the interior end of core 12. The interface between end wall 13 and bolt 26 is face sealed by an O-ring 27. An O-ring 28 is retained in a groove formed in the cylindrical side wall of portion 16 to seal the interface between portions 16 and 18. An O-ring 29 is retained in a groove formed at the shoulder abutting end of portion 15 to seal the interface between portions 15 and 17.

An inlet 30 in casing 10 leads to manifold 23, and an outlet 31 in casing 10 leads to manifold 24. Inlet 30 and outlet 31 are axially aligned with each other in a flow plane that is parallel to end wall 13. It should be noted that partition 25 and the surfaces of groove 14 form an acute angle, e.g., 30°, with this flow plane. Taps 33 and 34, which are shown in plugged condition, provide access to upstream manifold 23 and downstream manifold 24, respectively, for pressure probes or other condition monitoring devices. A plugged drain 32 is also formed in casing 10 for access to upstream manifold 23.

A plurality (e.g., nine) of bistable valve elements 35 are removably mounted onto core 12 in a parallel arrangement to connect manifolds 23 and 24 across partition 25. Parallel axial bores 36 equal in number to valve elements 35 are formed in portion 15 from the exterior end thereof to groove 14. Parallel axial bores 37 equal in number to valve elements 35 are formed in portion 16 in alignment with bores 36 from groove 14 to the interior end of portion 16.

As illustrated in FIGS. 1 and 2 for one valve element 35, each valve element includes a nozzle body 38, a plunger 39, and a solenoid 40, enclosed in a housing 41. Nozzle body 38 has a passage 42 that forms a converging-diverging sonic gas nozzle designed for efficient pressure recovery. At its upstream end 43, nozzle body 38 has a diameter reduced to fit in bore 37. A shoulder 44 on nozzle body 38 is urged against the surface of groove 14 adjacent to bore 37 by one end of housing 41, which fits in bore 36. Housing 41 has a reduced end adjacent to nozzle body 38 that fits in a reduction in bore 36. Housing 41 is retained by a snap ring 45. Snap ring 45 bears against a resilient washer 46, which in turn bears against the end of housing 41 to urge it toward shoulder 44. An O-ring 58 is retained in a groove in the downstream end of nozzle body 38 to seal the interface between nozzle body 38 and bore 37. An O-ring 59 is retained in a groove formed in the side surface of the reduced end of housing 41 to seal the interface between housing 41 and the reduction in bore 36. Plunger 39 travels in a central cavity formed in housing 41 within solenoid 40. One end of a spring 48 is retained within a central cavity 49 of plunger 39. The other end of spring 48 bears against the end of cavity 47 normally to urge plunger 39 toward nozzle body 38. The downstream end of nozzle body 38 has a flat annular surface 55 against which the one end of housing 41 abuts. This end of housing 41 has semicircular recesses 56 around it. The end of plunger 39 adjacent to passage 42 has an elastomeric insert 57. Within annular surface 55, the end of nozzle body 38 protrudes in an inwardly tapered fashion to form an annular knife edge at the outlet of passage 42. When solenoid 40 is not energized, spring 48 urges plunger 39 against the end of nozzle body 38, insert 57 seals the outlet of passage 42, and valve element 35 is closed. When solenoid 40 is energized by electrical current, plunger 39 is drawn up inside cavity 47 to compress spring 48 and move insert 57 away from the outlet of passage 42, thereby opening valve element 35 to permit fluid flow from upstream manifold 23 axially through passage 42 and radially through the openings formed between recesses 56 and surface 55 to downstream manifold 24. To prevent modulation of flow by plunger 39 when valve element 35 is open, plunger 39 is retracted sufficiently to be out of the radially flowing fluid stream at the downstream end of nozzle body 38.

An open cavity 63 is formed at the exterior facing end of core 12. If the valve elements are actuated pneumatically instead of electrically as shown, cavity 63 could serve as an air reservoir. An electrical component board 64 for controlling the solenoids of valve elements 35, is mounted by spacers 65 on the external facing end of core 12 over cavity 63 by fasteners 66. In addition to bolt 26, core 12 is retained by a snap ring 67. A cover 68 is secured to casing 10 by fasteners 69 to close the open end of cavity 11. A threaded bore 70 provides electrical access to the interior of cavity 11 and a mounting location for an electrical connector.

The described apparatus is particularly suited for gas flow measurement as described in U.S. Pat. No. Re. 29,383, which is assigned to the assignee of the present application, because the upstream temperature is most conveniently sensed in manifold 23 rather than manifold 24. All the parts of the apparatus, namely, valve elements 35 and component board 64, are carried by core 12. In order to remove these parts for inspection, cleaning, or repair, it is only necessary to remove bolt 26, cover 68, and snap ring 67, and to withdraw core 12 from cavity 11; casing 10 can remain in the fluid line all the while. When scaling the apparatus for fluid lines having different diameters, only a relatively small increase in the diameter of casing 10 is required over a large range without substantially increasing the axial length of casing 10. Valve elements 35 can be quickly and easily assembled because they do not have a threaded connection with the bores of core 11.

In FIG. 3 is shown an alternative embodiment of one of the valve elements. This valve element is particularly designed for liquid or gas flow in the opposite direction from FIGS. 1 and 2, i.e., from manifold 24 to manifold 23, in a control mode as described in U.S. Pat. No. Re. 29,383. One end of a tube 75 extends through bore 37 to manifold 23. Radial clearance is provided between tubes 75 and bores 37 to allow for heat expansion. An integral flange 76 on tube 75 with a smaller diameter than bore 36 abuts portion 16. An O-ring 77 is retained in an annular groove formed in the face of flange 76 to seal the interface between tube 75 and bore 37. The base of a hollow cylindrical inner cage 78 is mounted on the end of tube 75. The end of cage 78 adjacent to tube 75 is open to permit communication with the interior thereof, and the opposite end of cage 78 is closed. Cage 78 has a plurality (e.g., 4) of openings 79 in its cylindrical side wall to permit communication between the interior of cage 78 and manifold 24. A hollow cylindrical plug 80 is closed at one end and open at the other end where it slidably fits closely about cage 78. The open end of plug 80 is inwardly tapered to form an annular knife edge. The closed end of plug 80 has pressure balancing holes 81. An O-ring 82 is retained in a groove formed around the closed end of cage 78 to seal the interface between plug 80 and the closed end of cage 78. A tubular outer cage 83 fits loosely over plug 80 and extends from the base of inner cage 78 into bore 36. Outer cage 83 has a plurality of openings 84 around its perimeter adjacent to inner cage 78 to connect manifold 24 with the interior of outer cage 83. A seal 85 comprises a metallic ring with an elastomeric material on its inner surface and one of its planar faces. Seal 85 is inserted between the base of inner cage 78 and one end of outer cage 83 so that the elastomeric material abuts the base of inner cage 78 and engages the knife edge end of plug 80 when plug 80 lies completely over inner cage 78. Tube 75, the base of inner cage 78, seal 85, and outer cage 83 are held together by fasteners 86.

A valve operator for actuating the valve element includes a base 90, a cylinder 91, a piston 92, a spring 93, a spring keeper 94, and a cover 95. Base 90 has a portion 96 that extends into bore 36 to abut the end of outer cage 83, and a flange 97 that is secured to portion 15 of cavity 11 by fasteners 98. An O-ring 99 is retained in a groove formed in portion 96 to seal the interface between base 90 and bore 36. Facing away from portion 15, base 90 has a grooved end 100 adapted to receive one end of cylinder 91. An O-ring 105 is retained in a groove formed at grooved end 100 to seal the interface between cylinder 91 and base 90. Cover 95 closes the other end of cylinder 91. Cover 95 is secured by fasteners 101 that pass through cover 95 along the length of cylinder 91 to form a threaded connection with flange 97. Piston 92 is free to move within cylinder 91. O-rings 102 and 103 are retained in grooves formed in the cylindrical side wall of piston 92 to seal the interface between cylinder 91 and piston 92. Spring 93 surrounds spring keeper 94, which is also free to move within cylinder 91, and extends between cover 95 and piston 92 where it is retained around an annular protrusion 104. Piston 92 and spring keeper 94 each have a threaded connection with one end of a valve stem 111 which extends through a seal 112 of conventional design in base 90 into the interior of outer cage 83 where it is connected to the closed end of plug 80. Specifically, the end of valve stem 111 has an enlarged knob 113 that is surrounded by a retaining cap 114 integral with the end of plug 80. Knob 113 is free to move within cap 114 so as to accommodate nonaxial force components exerted on valve stem 111. A small venting hole 115 is formed in cylinder 91 near cover 95. A port 116 is formed in base 90. Air from a pressurized source is supplied to and exhausted from cylinder 91 via port 116 by a conventional electrically controlled three-way valve (not shown).

In operation, when air under pressure is supplied to cylinder 91, piston 92 and spring keeper 94 are driven up against cover 95, as shown in FIG. 3, and plug 80 is lifted above openings 79 in inner cage 78 to open the valve element. As a result, fluid flows between manifolds 23 and 24 through tube 75, the interior of inner cage 78, openings 79, and openings 81. When air is exhausted from cylinder 91, spring 93 urges piston 92 and spring keeper 94 toward base 90 until the knife-edge of plug 80 completely covers openings 79 and engages seal 85, thereby to close the valve element and prevent fluid flow between manifolds 23 and 24.

In apparatus for controlling liquid flow, openings 79 are preferably used for orificing, i.e., their aggregate cross-sectional area varies with the weighting assigned to the valve elements, and is normally the smallest restriction in the flow path between manifolds 23 and 24. In such case, an orifice insert 117 having a selected cross-sectional area could also be secured at the end of tube 75 opening into manifold 23, as shown in FIG. 3. Three pressure reducing orifices, namely, insert 117, openings 79, and openings 84, are thus provided, which is advantageous in a liquid control mode. In a gas measurement mode, a converging-diverging sonic flow nozzle as shown by phantom lines 118 could be formed along the inside of tube 75 instead of insert 117, and in a liquid measurement mode, a cavitating venturi could be formed on the inside surface of tube 75 instead of insert 117. In the latter cases, orificing is normally accomplished at the throat of the nozzle or venturi and fluid flows from manifold 23 to manifold 24, as in FIG. 1.

The valve element of FIG. 3 can be easily removed by simply unscrewing fasteners 98 and slipping the entire structure out of bores 36 and 37. When the valve element is in place, flange 76 bears against portion 16 and flange 97 is spaced slightly from portion 15 to allow for heat expansion. Inner cage 78 and outer cage 83 serve to guide plug 80 as it opens and closes.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the feature of a removable core could be utilized in apparatus wherein the manifold separating partition is parallel to the flow plane, or the feature of an angulated partition aligned with the inlet and outlet could be utilized in apparatus wherein the housing does not have a removable valve element supporting core. Finally, the features directed to the valve elements themselves could be practiced in apparatus without the removable core feature and/or the angulated partition feature.

What is claimed is:

1. Digital fluid flow control apparatus comprising:
   a fluid inlet having an inlet axis that lies approximately in a flow plane;
   a fluid outlet having an outlet axis that lies approximately in the flow plane;
   a housing having an upstream manifold to which the inlet is connected, a downstream manifold to which the outlet is connected, and a planar partition between the upstream and downstream manifolds, the partition lying at an acute angle to the flow plane; and
   a plurality of individually actuatable bistable valve elements connecting the upstream and downstream manifolds across the partition.

2. The apparatus of claim 1, in which one of the manifolds has a side wall opposite to the partition that is approximately parallel to the flow axis.

3. The apparatus of claim 2, in which the other manifold has a side wall opposite to the partition that is approximately parallel to the partition.

4. The apparatus of claim 1, in which one of the manifolds has a side wall opposite to the partition that is approximately parallel to the partition.

5. The apparatus of claim 1, in which the housing comprises an outer casing having an open cavity with a side wall and an end wall, and a core removably fitting in the cavity, the core having an annular groove defining with the side wall of the cavity one of the manifolds, and having an end wall spaced from the end wall of the cavity to define the other manifold the portion of the core between the groove and the end wall of the core forming the partition.

6. The apparatus of claim 5, additionally comprising means for removably mounting the valve elements onto the core in a parallel arrangement.

7. The apparatus of claim 6, in which for each valve element a pair of unthreaded axially aligned bores are formed in the core portions of the bore on opposite sides of the annular groove, and the means for removably mounting each valve element comprises a shoulder on such valve element that contacts an abutting surface of the core when such valve element is mounted onto the core and means for clamping the valve element against the abutting surface.

8. The apparatus of claim 7, in which the abutting surface comprises a surface of the groove adjacent to the bore through the portion of the bore forming the partition.

9. Digital fluid flow control apparatus having an upstream manifold, a downstream manifold, and a plurality of individually actuatable bistable valve elements connecting the upstream and downstream manifolds, the improvement characterized in that the valve elements each comprise in one of the manifolds:
   a stationary hollow inner cage having a perforated side wall permitting communication between the inside and outside of the inner cage;

a movable plug surrounding the inner cage and axially slidable thereover to cover and uncover the side wall perforations of the inner cage;

a stationary hollow outer cage surrounding the plug, the outer cage having a perforated side wall permitting communication between the inside and outside of the outer cage;

means for sealing the interface between the side wall perforations in one of the cages and the plug when the plug covers the side wall perforations in the inner cage;

a tubular passage coupling the open end of the inner cage to the other manifold; and a converging-diverging nozzle formed in the tubular passage.

10. The apparatus of claim 9, in which the plug fits closely about the inner cage, the outer cage fits closely about the plug, the inner cage is closed at one end and open at the other end for communication with the other manifold, and the sealing means comprises an O-ring retained in the side wall of the inner cage near its closed end to engage the inner side wall of the plug and a face seal retained by the inner cage near its open end to engage the end of the plug when the plug covers the side wall perforations in the inner cage.

11. Digital fluid flow control apparatus having a housing with an upstream manifold to which the inlet is connected, a downstream manifold to which the outlet is connected, and a plurality of bores extending in part between the upstream and downstream manifolds; a fluid inlet in the housing to the upstream manifold; a fluid outlet in the housing to the downstream manifold; and a plurality of individually actuatable bistable valve elements fitting in the respective bores and connecting the upstream and downstream manifolds, characterized in that:

each bore is unthreaded;

each valve element has a shoulder that contacts an abutting surface of the housing when such valve element fits in the respective bore; and each valve element has means for removably clamping the valve element against the abutting surface, the clamping means comprising a resilient washer and a snap ring at the entrance of each bore.

12. The apparatus of claim 11, in which the clamping means comprises a flange on each valve element outside the entrance to the respective bore adjacent to the housing, and means for fastening the flange to the housing.

* * * * *